H. P. ARNDT.
SHAFT COUPLING.
APPLICATION FILED SEPT. 20, 1916.
1,230,646.
Patented June 19, 1917.
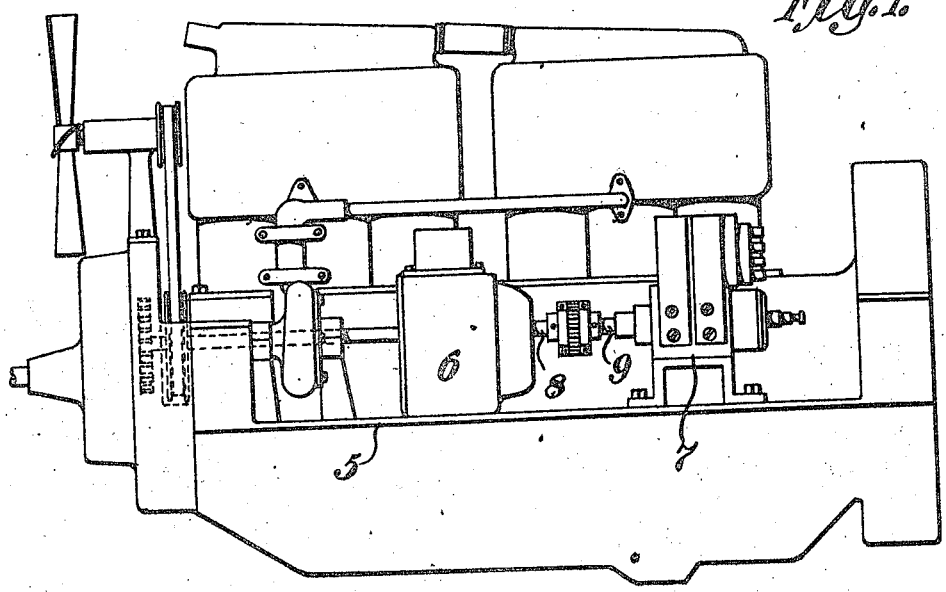
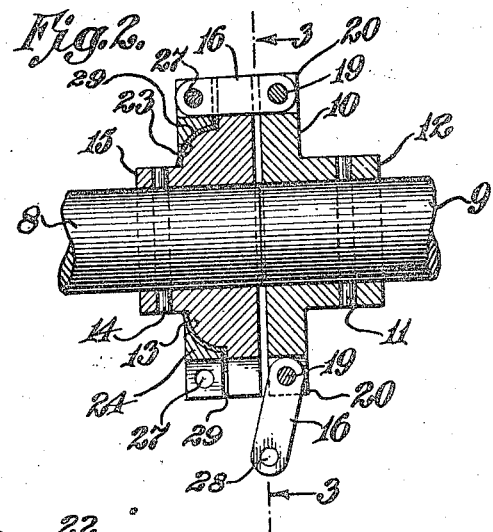
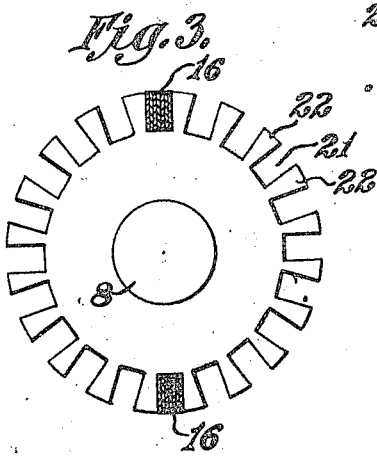
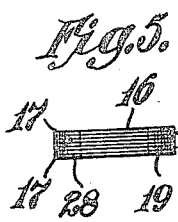
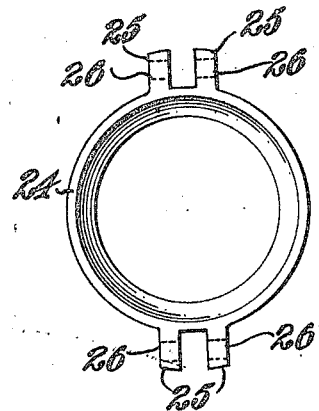
Attest:
Inventor:
Henry P. Arndt
by
Atty

UNITED STATES PATENT OFFICE.

HENRY P. ARNDT, OF AMSTON, CONNECTICUT, ASSIGNOR OF TWO-THIRDS TO CHARLES M. AMS, OF NEW YORK, N. Y.

SHAFT-COUPLING.

1,230,646.

Specification of Letters Patent.  Patented June 19, 1917.

Application filed September 20, 1916.  Serial No. 121,305.

*To all whom it may concern:*

Be it known that I, HENRY P. ARNDT, a citizen of the United States, and a resident of Amston, county of Tolland, and State of Connecticut, have invented certain new and useful Improvements in Shaft-Couplings, of which the following is a specification.

This invention relates generally to shaft couplings and clutches, with more particular reference to devices of this class adapted for employment when it is necessary or desirable to so connect a plurality of alined shafts that they shall bear a predetermined circumferential positional relation to each other; that is to say, so that a given imaginary radial line in one shaft may be brought to a desired rotative position relative to a similar line or lines in one or more shafts that are to be coupled thereto prior to making the connection, and thus a member mounted upon or connected with the driving shaft be permanently adjusted in any desired rotative position relative to a member mounted upon or connected with the driven shaft.

In various devices that are well known in the arts, it is frequently found necessary to initially regulate the rotative positions of two alined shafts, relative to each other. As a typical example of this requirement, I have illustrated in the accompanying drawings the application of my improved shaft coupling to the power plant of a motor vehicle driven by some type of explosive engine, the coupling in this instance being interposed between the shaft of the magneto and that of the generator. As is well known, in order to correctly and accurately time the ignition spark for an explosive engine, it is necessary to regulate with extreme nicety the relative positions of the shaft for the magneto, if one be used, and the generator shaft. With the various forms of shaft connections heretofore known, this operation is not only a difficult one, but also requires a very considerable amount of time, with corresponding expense for skilled labor, and is largely a matter of "cut and try." With my improved coupling, however, I minimize the time and expense involved in this necessary regulation, greatly increase the accuracy of the results obtained, practically eliminate experimental or trial adjustment, and employ less complicated, cumbersome and expensive mechanism than has been used, so far as I am aware, prior to the present invention.

With the above suggesting the principal objects of my invention, I may say that other objects are the provision of means of the character to which I have referred in which "play" or "lash" shall be minimized or entirely eliminated, which shall be simple, inexpensive, strong and durable, and which may be easily and quickly repaired, replaced or readjusted.

Other desirable features and objects of the present invention will be apparent from the following description of the accompanying drawings, which form part of this specification, and in which:

Figure 1 is a side elevation of the explosive-engine power plant of a motor vehicle, showing the use of my improved shaft coupling in connection therewith;

Fig. 2 is an enlarged sectional detail view of the coupling, with portions of the two shafts shown in elevation;

Fig. 3 is a detail view, in sectional elevation, taken substantially on line 3—3 of Fig. 2;

Fig. 4 is a detail view, in rear elevation, of the auxiliary ring shown in Fig. 2 as being adapted to receive the initially free ends of the locking clips by means of which the coöperating disks of the clutch are secured together, and Fig. 5 is a top plan view of one of said clips in its preferred form.

Referring now to the drawings in detail, numeral 5 designates a portion of the body frame-work of a motor vehicle, upon which are mounted a magneto 6 and a generator 7, the positions of said members being such, in this instance, that the shaft 8 of the magneto and the shaft 9 of the generator are in tandem, with their axes in the same horizontal and vertical planes, and with the adjacent ends of said shafts nearly but preferably not quite in contact.

The disk 10 of the coupling is secured to the shaft 9 by means of a through-pin 11, which engages the hub 12 of said disk, and disk 13 is secured to shaft 8 by means of a through-pin 14 engaging the hub 15 of the disk 13. Two similar locking clips 16 16, each preferably comprising a plurality of similar and symmetrically arranged plates 17 17, separated at one end by washers 18 18, are pivotally mounted upon pins 19 secured between lugs 20 20 projecting from the periphery of the disk 10 at diametrically opposite points. The periphery of the disk 13 is formed into a series of notches 21, each having parallel sides, leaving a series of equidistantly disposed projections 22 therebetween which are somewhat similar to gear-teeth, the width and depth of said notches being such that one of the clips 16 may fit snugly therein. The back portion of disk 13 is symmetrically curved at 23, and a ring 24 is loosely fitted upon said curved portion, the periphery of said ring being provided with diametrically opposed pairs of lugs 25 25 which are similar to the lugs 20 20 on the disk 10, those of each pair being separated sufficiently to receive the end of one of the clips 16 snugly therebetween, and holes 26 26 are provided for the reception of pins 27 adapted to be passed therethrough and through holes 28 in the initially free ends of the clips 16.

From the foregoing description it will be apparent that when both of the clips 16 are moved pivotally out of engagement with the notches 21 in the periphery of disk 13 (see position of lower clip in Fig. 2), the disks 10 and 13, and hence the shafts 8 and 9, are free to rotate independently of each other. When it is desired to couple shafts 8 and 9 together, one or the other or both are revolved until given points upon the peripheries of disks 10 and 13 are in the desired rotative positions relative to each other; then the ring 24 is turned, if necessary, until the lugs 25 25 are in position to receive the clips 16; then said clips are moved pivotally into engagement with the proper notches 21 in the periphery of disk 13, and thus into their positions between the respective pairs of lugs 25 on ring 24, and the coupling operation is completed by passing the pins 27 through the registering holes in the lugs and the clip ends.

It will be noted that since the plates 17, which go to make up each of the clips 16, in its preferred form, are separated at their pivot ends by washers 18, while the other ends of said plates have open spaces therebetween, the engagement of each of these clips with the notches 21 and with the lugs 25 is of a yielding nature, thus not only facilitating the insertion of said clips into said notches and between said lugs, but also tending to minimize or entirely eliminate "play" or "lash" in the connection between the disk 10 and the disk 13, and hence in the connection between the driving and driven shafts.

Many modifications of minor details of my improved shaft coupling will doubtless readily suggest themselves to those skilled in the art to which it appertains, and I therefore do not desire to limit my invention to the specific embodiment thereof herein shown and described.

I claim as new and desire to secure by Letters Patent:

1. In a device of the character described, the combination, with two alined shafts, of a disk element fixed upon each shaft at the meeting ends of said shafts, one of said disk elements being provided with a series of equidistantly disposed peripheral retaining notches, and the other disk element having pivoted at the periphery thereof a locking arm adapted to be received and engaged by one of said retaining notches, selectively, and means for removably securing said arm in its engaging position.

2. In a device of the character described, the combination, with two alined shafts, of a disk element fixed upon each shaft at the meeting ends of said shafts, one of said disk elements being provided with a series of equidistantly disposed peripheral retaining notches, and the other disk element having pivoted at the periphery thereof a locking arm adapted to be received and engaged by one of said retaining notches selectively, a loose ring associated with said first-mentioned disk element and provided with a peripheral recess adapted to receive the end of said arm when the latter is in its engaging position, and means for removably securing said arm end within said recess.

3. In a device of the character described, the combination, with two alined shafts, of a disk element fixed upon each shaft at the meeting ends of said shafts, one of said disk elements being provided with a series of equidistantly disposed peripheral retaining notches, and the other disk element having pivoted at the periphery thereof a plurality of locking arms adapted to be received and engaged by the retaining notches opposite said arms, selectively, and means for removably securing said arms in their engaging positions.

4. In a device of the character described, the combination, with two alined shafts, of a disk element fixed upon each shaft at the meeting ends of said shafts, one of said disk elements being provided with a series of equidistantly disposed peripheral retaining notches, and the other disk element having pivoted at the periphery thereof a plurality of locking arms adapted to be received and engaged by corresponding retaining notches, selectively, a loose ring associated with said first-mentioned disk element and provided with peripheral recesses adapted to receive the ends of said arms when the latter are in their engaging positions, and means for removably securing said arm ends within said recesses.

5. In a device of the character described, the combination, with two alined shafts, of a disk element fixed upon each shaft at the meeting ends of said shafts, one of said disk elements being provided with a series of equidistantly disposed peripheral retaining notches, and the other disk element having pivoted at the periphery thereof a locking arm adapted to be received and engaged by one of said retaining notches, selectively, and means for removably securing said arm in its engaging position, said arm comprising a series of plates slightly spaced apart at the pivoted end only of said arm whereby the remaining major portions of said plates are normally held in a slightly separated condition.

6. In a device of the character described, the combination, with two alined shafts, of a disk element fixed upon each shaft at the meeting ends of said shafts, one of said disk elements being provided with a series of equidistantly disposed peripheral retaining notches, and the other disk element having pivoted at the periphery thereof a locking arm adapted to be received and engaged by one of said retaining notches selectively, a loose ring associated with said first-mentioned disk element and provided with a peripheral recess adapted to receive the end of said arm when the latter is in its engaging position, and means for removably securing said arm end within said recess, said arm comprising a series of plates slightly spaced apart at the pivoted end only of said arm whereby the remaining major portions of said plates are normally held in a slightly separated condition.

In testimony of the foregoing, I have hereunto set my hand in the presence of two witnesses.

HENRY P. ARNDT.

Witnesses:
EDLA MOTT,
CHESTER F. HAYDEN.